(12) United States Patent
Tian (10) Patent No.: US 12,508,771 B2
(45) Date of Patent: *Dec. 30, 2025

(54) 3D PRINTING SYSTEM

(71) Applicant: SHENZHEN TUOZHU TECHNOLOGY CO., LTD., Shenzhen (CN)

(72) Inventor: Kaiwang Tian, Shenzhen (CN)

(73) Assignee: SHENZHEN TUOZHU TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,919

(22) Filed: Mar. 16, 2025

(65) Prior Publication Data
US 2025/0205971 A1   Jun. 26, 2025

Related U.S. Application Data

(63) Continuation of application No. 18/460,596, filed on Sep. 4, 2023, now Pat. No. 12,384,113, which is a
(Continued)

(30) Foreign Application Priority Data

Jan. 17, 2022   (CN) .......................... 202210058867.7

(51) Int. Cl.
| | | |
|---|---|---|
| *B29C 64/321* | (2017.01) | |
| *B65H 51/12* | (2006.01) | |
| *B33Y 30/00* | (2015.01) | |

(52) U.S. Cl.
CPC ........... *B29C 64/321* (2017.08); *B65H 51/12* (2013.01); *B33Y 30/00* (2014.12); *B65H 2404/421* (2013.01)

(58) Field of Classification Search
CPC ... B29C 64/118; B29C 64/321; B29C 64/336; B65H 51/12; B65H 2404/421; B33Y 10/00; B33Y 30/00
See application file for complete search history.

(56) References Cited

U.S. PATENT DOCUMENTS

| | | |
|---|---|---|
| 9,233,504 B2 | 1/2016 | Douglas et al. |
| 2010/0096489 A1* | 4/2010 | Taatjes .................. B29C 64/118 242/520 |

(Continued)

FOREIGN PATENT DOCUMENTS

| | | |
|---|---|---|
| CN | 1216726 A | 8/2005 |
| CN | 103481515 A | 1/2014 |

(Continued)

OTHER PUBLICATIONS

Office Action of Chinese Patent Application No. 202420942562.7 Dated Sep. 19, 2024.

(Continued)

*Primary Examiner* — Jamel M Nelson
(74) *Attorney, Agent, or Firm* — KILPATRICK TOWNSEND & STOCKTON LLP (57) ABSTRACT

Various embodiments provide a filament replacement mechanism for a 3D printer and a 3D printing system. In those embodiments, the filament replacement mechanism includes: a support; a filament guide unit disposed on the support and including a plurality of secondary filament guide tubes and a filament guide opening connecting with the plurality of secondary filament guide tubes, where the filament guide opening is configured to be jointed with a main filament guide tube of the 3D printer; and a plurality of filament replacement units disposed on the support.

20 Claims, 6 Drawing Sheets

Related U.S. Application Data continuation of application No. PCT/CN2023/071921, filed on Jan. 12, 2023.

(56) References Cited

U.S. PATENT DOCUMENTS

| | | | |
|---|---|---|---|
| 2015/0108687 A1* | 4/2015 | Snyder | B29C 64/393 425/375 |
| 2015/0251353 A1* | 9/2015 | Rodgers | B29C 64/112 264/308 |
| 2018/0207869 A1 | 7/2018 | Lee et al. | |
| 2019/0127176 A1 | 5/2019 | Franklin-Hensler et al. | |
| 2021/0039317 A1* | 2/2021 | Markman | B33Y 30/00 |

FOREIGN PATENT DOCUMENTS

| | | | | |
|---|---|---|---|---|
| CN | 104085110 | A | | 10/2014 |
| CN | 104690973 | A | | 6/2015 |
| CN | 205705348 | U | | 11/2016 |
| CN | 206884173 | U | | 1/2018 |
| CN | 108422662 | A | | 8/2018 |
| CN | 108638502 | A | | 10/2018 |
| CN | 208084982 | U | | 11/2018 |
| CN | 209141458 | U | | 7/2019 |
| CN | 209208085 | U | | 8/2019 |
| CN | 110509541 | A | | 11/2019 |
| CN | 111531873 | A | | 8/2020 |
| CN | 112428578 | A | | 3/2021 |
| CN | 212747141 | U | * | 3/2021 ............. B29B 13/06 |
| CN | 112776338 | A | | 5/2021 |
| CN | 113246461 | A | | 8/2021 |
| CN | 113442435 | A | | 9/2021 |
| CN | 214353524 | U | | 10/2021 |
| CN | 214562955 | U | | 11/2021 |
| CN | 215396947 | U | | 1/2022 |
| CN | 114474738 | A | | 5/2022 |
| KR | 101645250 | B1 | | 8/2016 |
| KR | 102158571 | B1 | | 9/2020 |
| WO | WO-2021060977 | A1 | * | 4/2021 ............. G01B 7/026 |

OTHER PUBLICATIONS

Office Action of Chinese Patent Application No. 202421297539.3 Dated Sep. 29, 2024.
European Search Report of EP 24171595.2 Dated Jul. 16, 2024.
European Search Report of EP 23470070.0 Dated Jul. 17, 2024.
Office Action of Chinese Patent Application No. 202210058867.7 Dated Nov. 25, 2023.
Office Action of Chinese Patent Application No. 202210058867.7 Dated Feb. 27, 2024.
International Search Report of PCT/CN2023/071921.
Yanbo Liu et al., "3D Printing Technology", Beijing Institute of Technology Press, Aug. 2021, p. 111.
Ideas on boosting speed for multi-color printiing with AMS, https://forum.bambulab.com/t/ideas-on-boosting-speed-for-multi-color-printing-with-ams/10037.
Notice of Acceptance of Invalidation Request of Chinese Patent Application No. 202421297539.3 dated Nov. 6, 2025.

* cited by examiner

3D PRINTING SYSTEM

CROSS-REFERENCE TO RELATED APPLICATIONS

This application is a continuation of U.S. patent application Ser. No. 18/460,596, filed on Sep. 4, 2023, which is a continuation of International Patent Application No. PCT/CN2023/071921, filed on Jan. 12, 2023. The International Patent Application claims priority to Chinese Patent Application No. 202210058867.7, filed on Jan. 17, 2022. The disclosures of the aforementioned applications are hereby incorporated by reference in their entireties.

TECHNICAL FIELD

The present disclosure relates to the field of three-dimensional (3D) printing technology, and in particular to a 3D printing system.

BACKGROUND 3D printer, also known as three-dimensional printer, constructs a 3D object by layer-by-layer printing. 3D printer includes a printing head for extruding a printing material and a print table for depositing the printing material to form a 3D object. The printing head is configured to move relative to the print table and to extrude the printing material onto the print table while moving. The printing material is deposited layer by layer on the surface of the print table and fused together to form the 3D object.

With the rapid development of 3D printing technology, there are increasingly diverse demands for colors and materials of printed objects. How to satisfy the diversified printing demands is gradually turning into a research hotspot.

SUMMARY

It would be advantageous to provide a mechanism that alleviates, mitigates or even eliminates one or more of the above-mentioned problems.

According to an aspect of the present disclosure, a filament replacement mechanism for a 3D printer is provided, including: a support; a filament guide unit disposed on the support and including a plurality of secondary filament guide tubes and a filament guide opening connecting with the plurality of secondary filament guide tubes, where the filament guide opening is configured to be jointed with a main filament guide tube of the 3D printer; and a plurality of filament replacement units disposed on the support, each of the plurality of filament replacement units automatically performing a loading operation and an unloading operation on a corresponding filament spool of a plurality of filament spools for the 3D printer. The filament replacement mechanism for a 3D printer according to the present disclosure has the beneficial effects that a variety of filaments can be automatically provided for the 3D printer according to printing needs, and the replacement of filament spools is also facilitated. Each of the filament replacement units includes: a supporting shaft assembly rotatably connected to the support and configured to be in contact with a rim of a corresponding filament spool of the plurality of filament spools so as to support the corresponding filament spool; and a loading and unloading mechanism configured to drive a filament wound around the corresponding filament spool to enable the filament to be guided into the main filament guide tube via one corresponding secondary filament guide tube of the plurality of secondary filament guide tubes when the 3D printer performs a loading operation, and configured to drive the corresponding filament spool to rotate such that the filament withdrawn from the main filament guide tube via the filament guide unit is rewound around the corresponding filament spool when the 3D printer performs an unloading operation.

According to an aspect of the present disclosure, a 3D printing system is provided, comprising a 3D printer and a filament replacement mechanism according to the foregoing aspect.

These and other aspects of the present disclosure will become clear on the basis of the embodiments described hereinafter, and will be elucidated with reference to the embodiments described hereinafter.

BRIEF DESCRIPTION OF THE DRAWINGS

Further details, features and advantages of the present disclosure are disclosed in the following description of exemplary embodiments in conjunction with the accompanying drawings. In the accompanying drawings.

DETAILED DESCRIPTION

It will be understood that, although the terms "first," "second," "third", etc., may be used herein to describe various elements, components, regions, layers and/or portions, such elements, components, regions, layers and/or portions shall not be limited by these terms. These terms are merely intended to distinguish one element, component, region, layer or portion from another element, component, region, layer or portion. Thus, the first element, component, region, layer or portion discussed below may be referred to as a second element, component, region, layer or portion without departing from the teachings of the present disclosure.

For ease of description, spatially relative terms, such as "under", "beneath", "lower", "below", "on top of", and "upper" and the like may be used herein to describe the relationship between one element or feature and another element(s) or feature(s) shown in the figures. It will be understood that, these spatially relative terms are intended to encompass different orientations of a device in use or operation in addition to the orientation depicted in the figure.

For example, if the device in the figure is turned over, an element described as "beneath another element or feature" or "under another element or feature" or "below another element or feature" would then be oriented as "on top of another element or feature". Thus, exemplary terms "beneath" and "below" may encompass both orientations "on top of" and "beneath". Similarly, terms such as "before" or "prior to" and "after" or "next" may be used, for example, to indicate the order in which light passes through elements. The device can be otherwise oriented (rotated 90 degrees or at other orientations), and the spatially relative descriptors used herein are construed accordingly.

The terms used herein are merely for the purpose of describing specific embodiments, and are not intended to limit the present disclosure. As used herein, the singular forms "a", "an" and "the" are intended to include the plural forms as well, unless the context clearly indicates otherwise. It will be further understood that, the terms "comprises" and/or "comprising," when used in this specification, specify the presence of described features, entireties, steps, operations, elements, and/or components, but do not preclude the presence or addition of one or more other features, entireties, steps, operations, elements, components, and/or groups thereof. As used herein, the term "and/or" includes any of and all combinations of one or more of the associated listed items, and the phrase "at least one of A and B" means only A, only B, or both A and B.

It will be understood that, when an element or layer is referred to as being "on another element or layer," "connected to another element or layer," "coupled to another element or layer" or "adjacent to another element or layer", it can be directly on, directly connected to, directly coupled to or directly adjacent to another element or layer, or intervening elements or layers may be present. In contrast, when an element is referred to as being "directly on another element or layer", "directly connected to another element or layer", "directly coupled to another element or layer", or "directly adjacent to another element or layer", there are no intervening elements or layers present. However, in no case should "on" or "directly on" be construed as requiring one layer to completely cover an underlying layer.

Unless otherwise defined, all terms including technical terms and scientific terms used herein have the same meanings as those generally understood by those of ordinary skill in the art to which the present disclosure belongs. It will be further understood that, terms, such as those defined in commonly used dictionaries, should be construed as having meanings consistent with meaning of these terms in the relevant art and/or in the context of this specification, and should not be construed in an idealized or overly formal sense, unless explicitly defined herein.

In the related art, it is required to manually replace filament spools when a 3D printer prints different colors or different materials, which results in complicated operation and low efficiency.

In order to alleviate, mitigate or even eliminate one or more of the above-mentioned problems, the embodiments of the present disclosure provide a filament replacement mechanism for a 3D printer and a 3D printing system, such that various filaments can be automatically provided for the 3D printer according to printing needs, and the replacement of filament spools is also facilitated.

The embodiments of the present disclosure are described in detail below with reference to the accompanying drawings.

Figure 1:
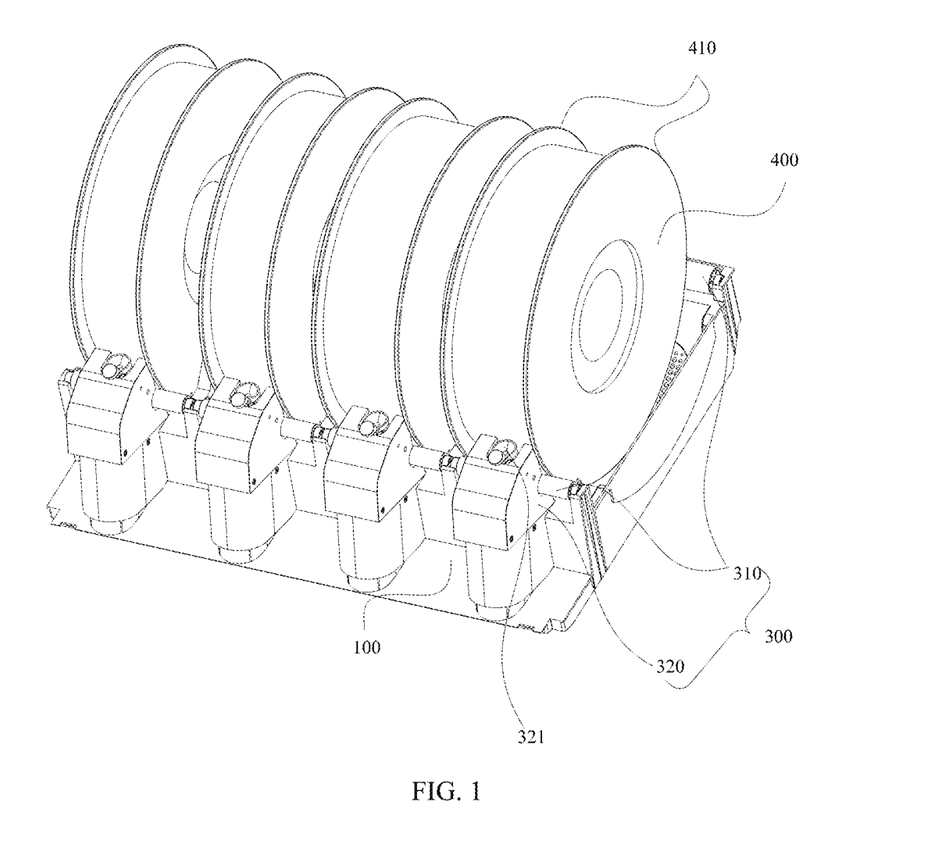
FIG. 1 shows a stereoscopic structure diagram of a filament replacement mechanism according to some exemplary embodiments of the present disclosure.
Figure 2:
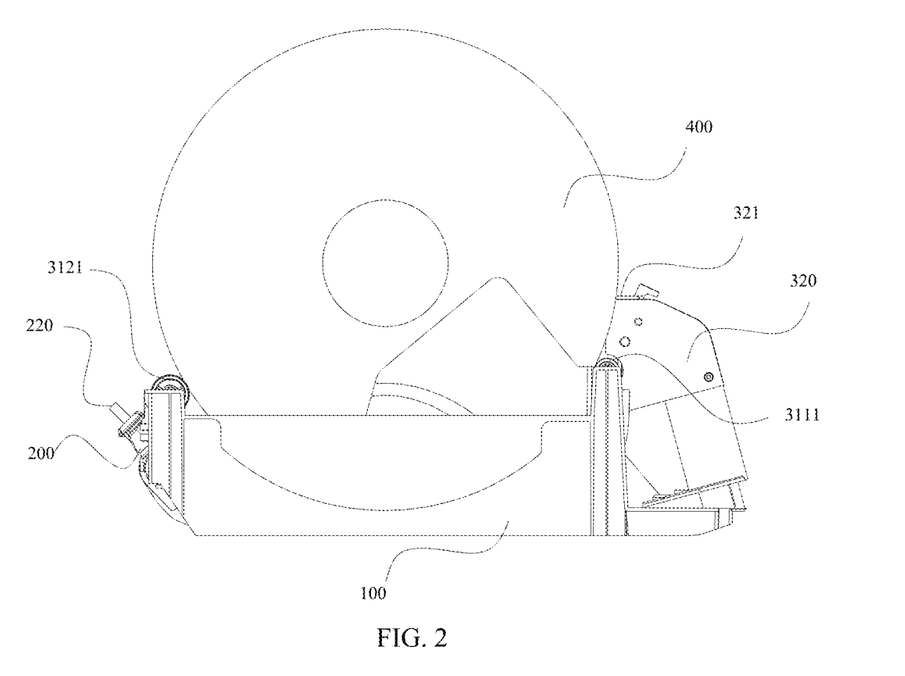
FIG. 2 shows a side view of a filament replacement mechanism according to some exemplary embodiments of the present disclosure.
Figure 3:
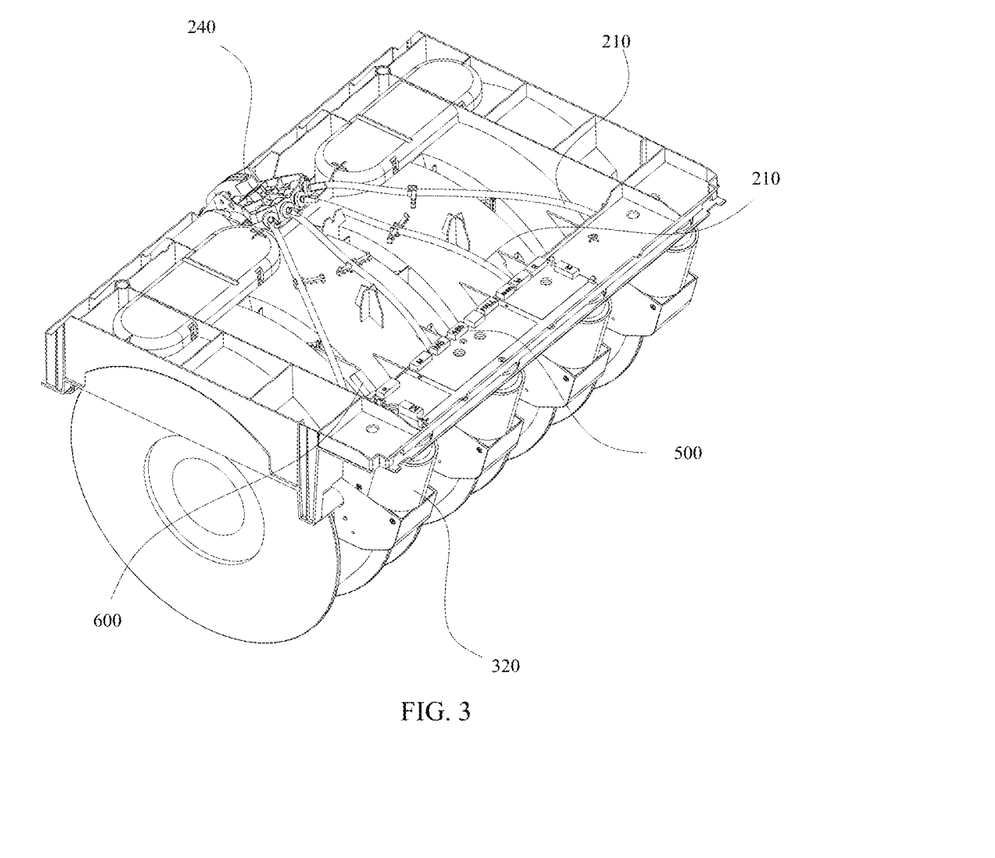
FIG. 3 shows a rear view of a filament replacement mechanism according to some exemplary embodiments of the present disclosure.

FIG. 1 shows a stereoscopic structure diagram of a filament replacement mechanism according to some embodiments of the present disclosure. FIG. 2 shows a side view of a filament replacement mechanism according to some embodiments of the present disclosure. FIG. 3 shows a rear view of a filament replacement mechanism according to some embodiments of the present disclosure.

Referring to FIG. 1 to FIG. 3, some embodiments of the present disclosure provide a filament replacement mechanism for a 3D printer, including: a support 100, a plurality of filament replacement units 300 and a filament guide unit 200.

The filament guide unit 200 is disposed on the support 100. The filament guide unit 200 includes a plurality of secondary filament guide tubes 210 and a filament guide opening 220 connecting with the plurality of secondary filament guide tubes 210. The filament guide opening 220 is configured to be jointed with a main filament guide tube of the 3D printer.

The plurality of filament replacement units 300 are disposed on the support 100. Each of the plurality of filament replacement units 300 automatically performs a loading operation and an unloading operation on a corresponding filament spool of a plurality of filament spools for the 3D printer, where each filament replacement unit 300 includes: a supporting shaft assembly 310 and a loading and unloading mechanism 320. The supporting shaft assembly 310 is rotatably connected to the support 100 and may be configured to be in contact with a rim 410 of a corresponding filament spool 400 of the plurality of filament spools 400 to support the corresponding filament spool 400. The loading and unloading mechanism 320 is configured to drive a filament wound around the corresponding filament spool 400 to enable the filament to be guided into the main filament guide tube via one corresponding secondary filament guide tube 210 of the plurality of secondary filament guide tubes 210 when the 3D printer performs a loading operation, and is configured to drive the corresponding filament spool 400 to rotate such that the filament withdrawn from the main filament guide tube via the filament guide unit 200 is rewound around the corresponding filament spool 400 when the 3D printer performs an unloading operation.

In some embodiments of the present disclosure, the support 100 may be made of a plastic material or a metal material, and the support 100 is configured to mount the filament guide unit 200 and the filament replacement unit 300.

In an embodiment of the present disclosure, the filament guide unit 200 includes a plurality of secondary filament guide tubes 210, and the secondary filament guide tubes 210 are all connected to one filament guide opening 220. In some embodiments, the plurality of secondary filament guide tubes 210 may be manufactured by an integrated molding process, but the present disclosure is not limited thereto.

In some embodiments, the filament guide unit 200 may further include a multi-channel member 240, and the multi-channel member 240 connects the plurality of secondary filament guide tubes 210 to the filament guide opening 220. The multi-channel member 240 may have an outlet configured to be jointed with the main filament guide tube, and a plurality of inlets connecting with the outlet, where the inlets may be configured to connect one secondary filament guide tube 210, and the outlet may constitute the filament guide opening 220. In some embodiments, an auxiliary extrusion wheel (not shown) is disposed inside the multi-channel member 240 to assist the loading and unloading mechanism 320 in performing a loading operation and an unloading operation. In some embodiments, a filament sensor (not shown) may be further disposed inside the multi-channel member 240 to detect the position of the filament in the filament guide tube.

Each filament spool 400 may include two baffles spaced along an axis of rotation of the filament spool and a cylindrical or cylinder-like winding portion for winding of the filament located in between the two baffles, where the radius of the baffle is greater than the radius of the winding portion so as to prevent the filament from falling off the winding portion. The cylindrical surface of each baffle may constitute the rim 410 of the filament spool 400. The free end of the filament of each filament spool 400 may stretch into a corresponding secondary filament guide tube 210.

The filament replacement unit 300 includes a supporting shaft assembly 310 and a loading and unloading mechanism 320. The supporting shaft assembly 310 can be rotatably connected to the support 100. For example, the supporting shaft assembly 310 may be connected to the support 100 via a bearing. The cylindrical surface of the supporting shaft assembly 310 is configured to be in contact with the rim 410 of the filament spool 400 to support the filament spool 400. The supporting shaft assembly 310 may be in force transfer contact with the rim 410 of the filament spool 400 such that when one rotates, the other can follow the former to rotate. The supporting shaft assembly 310 may be of various structures, which will be further described later.

In some embodiments, the loading and unloading mechanism 320 may be configured to drive the filament spool to rotate and achieve loading and unloading. For example, the loading and unloading mechanism 320 may include a loading motor and an unloading motor which may be separately in transmission connection with the filament spool. Taking the loading motor as an example, the loading motor can drive a friction wheel that is in contact with the rim 410 of the filament spool 400 to achieve rotation of the filament spool. For another example, the loading motor can also directly drive the filament to move by driving a friction wheel in direct contact with the filament, and drive the filament spool to rotate by the movement of the filament.

Either way, when the 3D printer performs a loading operation, the loading motor may be configured to drive the filament spools 400 to rotate in a forward direction, such that the filament wound around the corresponding filament spool 400 is guided into the main filament guide tube via one corresponding secondary filament guide tube 210 and after penetrating through the filament guide opening 220. When the 3D printer performs an unloading operation, the unloading motor may be configured to drive the corresponding filament spool 400 to rotate in a reverse direction, such that a free end of the filament is withdrawn from the main filament guide tube via the filament guide unit 200. The withdrawn filament can be rewound around the corresponding filament spool 400, thereby avoiding the problem that the filament is accumulated around the filament spool 400 and wound around other mechanisms after return of materials.

When it is required to replace the current filament, the filament can be withdrawn from the main filament guide tube through the loading and unloading mechanism 320 corresponding to the current filament, and then a required filament is guided into the main filament guide tube through the loading and unloading mechanism 320 corresponding to the required filament. During printing, the printing motor of the 3D printer can drive the filament in the main filament guide tube to move, so as to drag the filament spool 400 to rotate. At this time, the loading motor and the unloading motor can be in drive disengagement from the filament spool 400, such that the movement of the filament spool 400 is not influenced.

In addition, the loading and unloading mechanism 320 can be arranged to a structure having only one driving motor except for the loading motor and the unloading motor, and the forward and reverse rotation of the filament spool can be realized through the forward and reverse rotation of the driving motor.

Through the arrangement of the filament guide unit 200 and the filament replacement unit 300, a required filament can be automatically provided for the 3D printer to achieve printing of three-dimensional objects of various colors or various materials, and the unnecessary filament after the return of materials can be automatically wound around the filament spool 400 to keep a clean and tidy environment surrounding the filament spool 400. Meanwhile, the supporting shaft assembly 310 can reduce friction produced during rotation of the filament spool, so as to facilitate loading and unloading. Also, since the supporting shaft assembly 310 is supported on the rim 410 of the filament spool 400, the filament spool 400 can be mounted to the filament replacement mechanism simply by gravity, without other complicated mounting structures. After the filament is consumed, the filament spool 400 can be conveniently taken down from the filament replacement mechanism without disassembling other components, which facilitates replacement.

Figure 4:
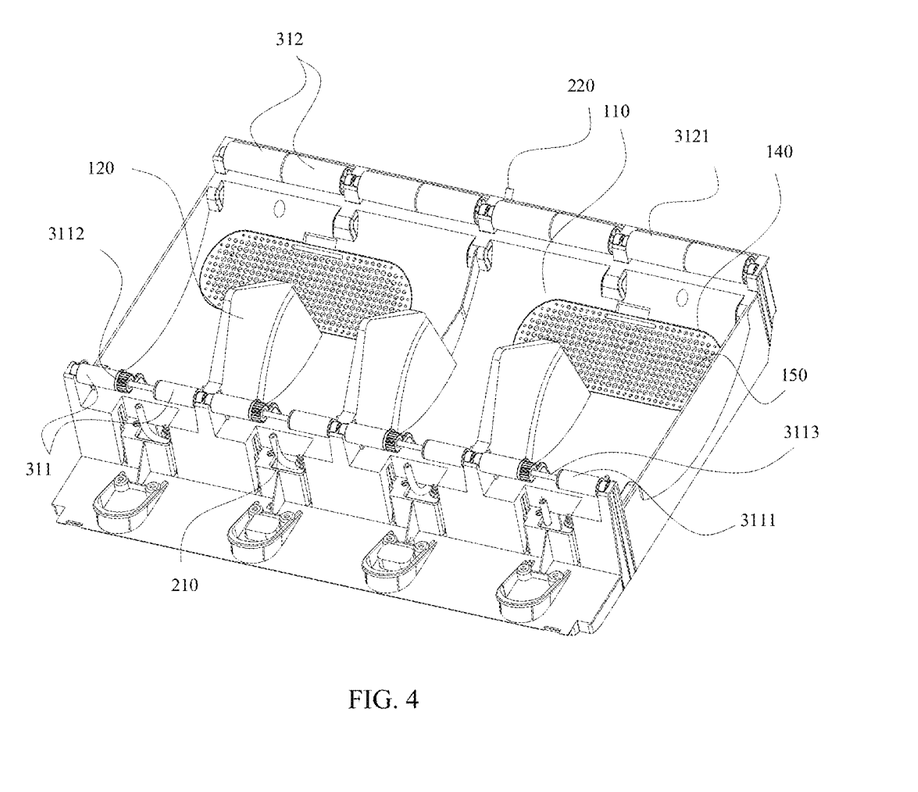
FIG. 4 shows a stereoscopic structure diagram of a filament replacement mechanism after the removal of a filament spool and a loading and unloading mechanism according to some exemplary embodiments of the present disclosure.

In some embodiments, referring to FIG. 4, the supporting shaft assembly 310 includes a first supporting shaft set 311 and a second supporting shaft set 312 rotatably connected to the support 100 separately, where the first supporting shaft set 311 and the second supporting shaft set 312 are spaced apart from each other in a circumferential direction of the corresponding filament spool 400, and a first axis of rotation of the first supporting shaft set 311, a second axis of rotation of the second supporting shaft set 312, and an axis of rotation of the corresponding filament spool 400 are parallel to one another.

Referring to FIG. 1, with one side of the filament spool 400 close to the loading and unloading mechanism 320 as a front side, the first supporting shaft set 311 and the second supporting shaft set 312 are mounted at the front side and the rear side of the filament spool 400, respectively, thereby playing a role of stable support.

Figure 5:
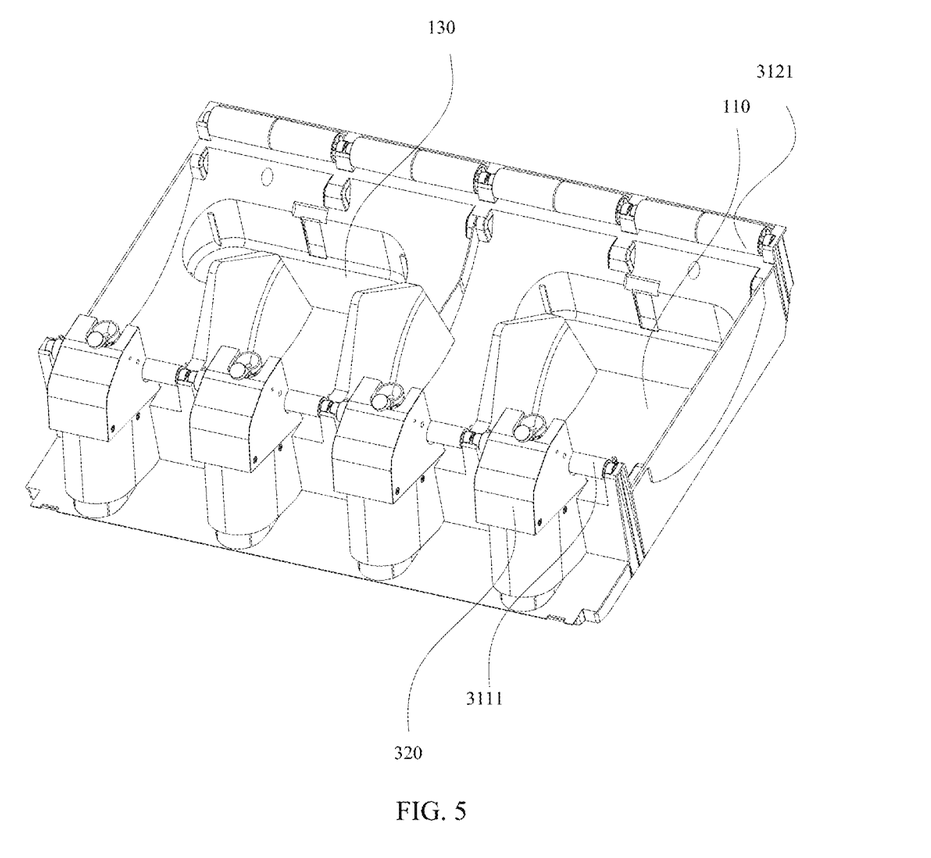
FIG. 5 shows a stereoscopic structure diagram of a filament replacement mechanism after the removal of a filament spool and a top cover according to some exemplary embodiments of the present disclosure.

FIG. 4 is a stereoscopic structure diagram of a filament replacement mechanism after the removal of a filament spool and a loading and unloading mechanism according to some embodiments of the present disclosure. FIG. 5 is a stereoscopic structure diagram of a filament replacement mechanism after the removal of a filament spool and a top cover according to some embodiments of the present disclosure. Referring to FIG. 4 and FIG. 5, in some embodiments, the first supporting shaft set 311 includes two first supporting shafts 3111 arranged along the first axis of rotation such that circumferential surfaces of the two first supporting shafts 3111 are in contact with two rims 410 of the corresponding filament spool 400, respectively, when the corresponding filament spool 400 is mounted in the filament replacement mechanism.

One end of one first supporting shaft 3111 facing away from the other first supporting shaft may be connected to the support 100 by a bearing. For example, a support plate may protrude from the support 100, an outer race of a bearing may be fixedly connected to the support plate, and an inner race of the bearing may be fixedly connected to the first supporting shaft 3111, such that the first supporting shaft 3111 may be rotatably connected to the support 100. Two first supporting shafts 3111 being in contact with the two rims 410 respectively are arranged, such that the volume of the first supporting shaft set 311 can be reduced while stable supporting is achieved, and mounting of other structures is facilitated.

In some embodiments, at least one first supporting shaft 3111 of the two first supporting shafts 3111 is provided with a gear 3112 which is configured to be driven by the loading and unloading mechanism 320 when the 3D printer performs the unloading operation, such that the first supporting shaft 3111 drives the corresponding filament spool 400 to rotate, so as to rewind the filament around the corresponding filament spool 400.

The gear 3112 may be coaxially connected to a first supporting shaft 3111, such that the two may rotate synchronously. The loading and unloading mechanism 320 can be in transmission connection with the gear 3112, for example, the unloading motor can be in transmission connection with the gear 3112 through a transmission mechanism, such that when unloading is performed, the gear 3112 is driven to rotate, and then the filament spool 400 is driven to rotate in the reverse direction under friction force between the first supporting shaft 3111 and the filament spool 400. During loading and printing, the unloading motor may be in drive disengagement from the gear 3112, such that the first supporting shaft 3111 may freely rotate following the filament spool 400.

In some embodiments, one end of the corresponding secondary filament guide tube 210 away from the filament guide opening 220 is arranged adjacent to a middle portion of the first supporting shaft set 311 along the first axis of rotation. This allows the free end of the filament on the filament spool 400 to enter the secondary filament guide tube 210 at a suitable angle relative to the winding portion of the filament spool 400, which reduces friction produced during loading and unloading. In some embodiments, one end of the corresponding secondary filament guide tube 210 away from the filament guide opening 220 is disposed close to a lower part of a middle position of the two first supporting shafts 3111, such that the filament can freely fall into the secondary filament guide tube 210 by gravity, and is thus more convenient to use.

In some embodiments, the two first supporting shafts 3111 may be coaxially connected to each other, and the middle portion of the first supporting shaft set 311 is provided with a connecting shaft 3113 having a radial dimension smaller than that of the two first supporting shaft set 311. The two first supporting shafts 3111 may be connected through the connecting shaft 3113, which can not only improve the strength of the first supporting shaft set 311, but also reduce the space of the first supporting shaft set 311, so as to avoid greater friction produced by the contact between the filament and the supporting shaft set.

In other embodiments, the two first supporting shafts 3111 may also be separated from each other, and the middle portion of the first supporting shaft set 311 is a gap between the two first supporting shafts 3111, such that the space occupied by the first supporting shaft set 311 may be further reduced.

In some embodiments, the second supporting shaft set 312 includes two second supporting shafts 3121 arranged along the second axis of rotation such that circumferential surfaces of the two second supporting shafts 3121 are in contact with the two rims 410 of the corresponding filament spool 400, respectively, when a corresponding filament spool 400 is mounted in the filament replacement mechanism. The volume of the first supporting shaft set 311 can be reduced while stable supporting is achieved, and mounting of other structures is facilitated. In some embodiments, similar to the two first supporting shafts 3111, the two second supporting shafts 3121 may be either coaxially connected to each other or separated from each other to achieve support of the filament spool 400.

The second supporting shaft 3121 is disposed in a manner similar to the first supporting shaft 3111. Referring to FIG. 2, the second supporting shaft 3121 is located at the rear side of the filament spool 400, the first supporting shaft 3111 is located at the front side of the filament spool 400, the loading and unloading mechanism 320 and the secondary filament guide tube 210 are disposed at the front side of the filament spool 400, and such structure is not disposed at the rear side. Reference may be made to the first supporting shaft 3111 for the structure and function of the second supporting shaft 3121, and details are not described herein.

In some embodiments, the loading and unloading mechanism 320 is disposed on one side of the first supporting shaft set 311 facing away from the second supporting shaft set 312, and a channel 321 for a filament to penetrate through is further disposed in the loading and unloading mechanism 320, and is jointed with the corresponding secondary filament guide tube 210. The channel 321 can play a guiding role, and the dimension of the filament exposed outside the channel 321 and the filament guide unit 200 is reduced, such that the filament is prevented from being wound around other components, and meanwhile, replacement of the filament spool can be facilitated.

One end of the channel 321 facing away from the secondary filament guide tube 210 may be provided with a trumpet-shaped opening, such that the filament can easily enter the channel 321, and the filament spool 400 can be conveniently replaced. Herein, the term "trumpet-shaped opening" means that one end of the channel 321 facing away from the secondary filament guide tube 210 has a gradually increasing inner diameter in a direction toward the outside of the channel 321.

Still referring to FIG. 4 to FIG. 5, the support 100 can be provided with an arc-shaped groove 110 extending in a predetermined direction, at least one separator 120 is disposed in the arc-shaped groove and is spaced in the predetermined direction to separate the arc-shaped groove 110 into a plurality of segments, and each of the segments is configured to at least partially accommodate a corresponding filament spool 400 of the plurality of filament spools 400.

The arc-shaped groove 110 may extend in the predetermined direction such that the surface of the support 100 has a downward recess. The predetermined direction may be an arrangement direction of the plurality of filament spools 400, and the separator 120 may be of a rib structure. There may be one or a plurality of separators 120, when there are a plurality of separators 120, the plurality of separators 120 may be spaced in the predetermined direction to separate the arc-shaped groove 110 into a plurality of segments, and each segment may accommodate at least a portion of a corresponding filament spool 400, such that the volume of the filament replacement mechanism can be reduced, resulting in a compact structure.

Referring to FIG. 3, the filament guide unit 200 may be located at one side of the support 100 facing away from the arc-shaped groove 110, that is, the filament spool 400 may be disposed at an upper side of the support 100, and the filament guide unit 200 may be disposed at a lower side of the support 100, such that the structure is relatively compact.

Referring to FIG. 4 and FIG. 5, the surface of the support 100 facing the plurality of filament spools 400 is provided with at least one desiccant groove 130 for accommodating a desiccant, and a top cover 140 is detachably mounted at an opening of each of the desiccant grooves 130, and is provided with a plurality of air holes 150.

In some embodiments, the desiccant groove 130 may be located at the bottom of the arc-shaped groove 110 and the top cover 140 may be of an arc-shaped structure that fits the groove wall of the arc-shaped groove 110, that is, the top cover 140 may form part of groove wall of the arc-shaped groove 110 and is in smooth transition with the other groove wall of the arc-shaped groove 110 such that the entire arc-shaped groove 110 may accommodate a corresponding filament spool 400.

A plurality of air holes 150 may be arranged in an array on the top cover 140 to allow the desiccant to absorb moisture from the surrounding environment and keep the surrounding environment dry, thereby providing a suitable working environment for the filament replacement mechanism.

In addition, the desiccant groove 130 may be disposed according to the number of segments. For example, each segment is provided with one desiccant groove 130. For another example, a plurality of segments may share one desiccant groove 130, and at this time, the dimension of the separator may be reduced such that the desiccant grooves 130 may span a plurality of segments, and may be provided as needed.

In some embodiments, the filament replacement mechanism further includes a humidity sensor 500 configured to detect the humidity of the surrounding environment of the plurality of filament spools 400. When the humidity exceeds a threshold value suitable for operation, an alarm can be given to prompt a user to replace the desiccant, or the operation can be stopped, and so on. The humidity sensor 500 may be disposed at various positions, e.g., in a circuit board on the back of the support 100.

In some embodiments, the filament replacement mechanism further includes a recognition sensor 600 configured to recognize identification information of the filament spool. Information identified by the recognition sensor 600 may be the length of the filament, the color or material of the filament, etc., in the filament spool 400. The identification information may be, e.g., a bar code or a two-dimensional code provided on the filament spool. The recognition sensor 600 may be configured to scan the identification information and acquire information about the filament spool 400 or the filament. The recognition sensor 600 may be disposed on the support 100, for example, one recognition sensor 600 may be disposed for each filament spool 400. Alternatively, a plurality of filament spools 400 may share one recognition sensor 600.

In some embodiments, the filament replacement mechanism includes a circuit board that may be disposed between two adjacent filament spools 400, and the recognition sensor 600 may be disposed on the circuit board such that the identification information of the two filament spools 400 can be scanned simultaneously.

Figure 6:
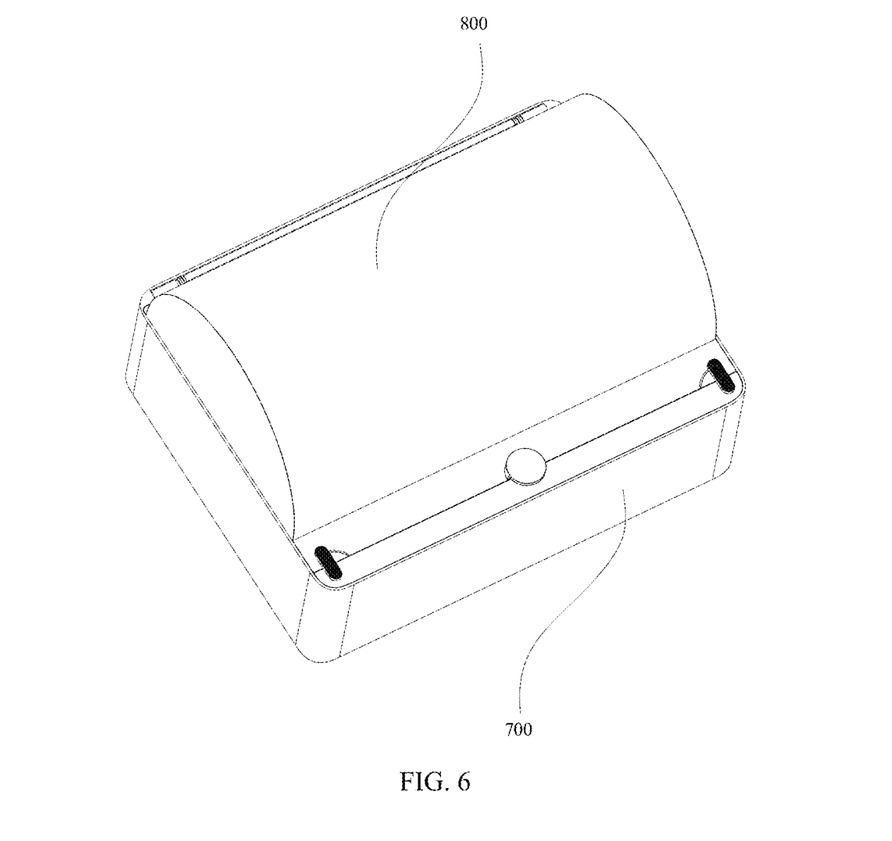
FIG. 6 shows a stereoscopic structure diagram of a filament replacement mechanism according to some exemplary embodiments of the present disclosure.

FIG. 6 shows a stereoscopic structure diagram of a filament replacement mechanism according to some embodiments of the present disclosure. Referring to FIG. 6, in some embodiments, the filament replacement mechanism further includes: a bottom case 700 and a cover body 800 matched with the bottom case 700, where the bottom case 700 and the cover body 800 jointly define an accommodating space, the support 100, the filament guide unit 200 and the plurality of filament replacement units 300 are all accommodated in the accommodating space, and the cover body 800 can move relative to the bottom case 700 to open or close the accommodating space.

In this embodiment, the bottom case 700 may be of a box-type structure, the cover body 800 may be disposed at an opening of the bottom case 700, and the cover body 800 may be detachably connected to the bottom case 700, or rotatably connected to the bottom case 700, such that the accommodating space may be opened or closed.

The bottom case 700 and the cover body 800 may be made of various materials, such as plastic or metal. Through the arrangement of the bottom case 700 and the cover body 800, the filament replacement mechanism can be transported and used as a whole, which is more conducive to maintaining dryness of the accommodating space, and can also facilitate replacement of the filament spool 400.

The embodiment of the present disclosure further provides a 3D printing system, including a 3D printer and the filament replacement mechanism according to any one of the embodiments described above. The 3D printer may be a device capable of printing a 3D object, and the structure and function of the filament replacement mechanism are the same as those of the above embodiments, and reference may be made to the above embodiments.

According to the 3D printing system provided by the embodiment of the present disclosure, through the arrangement of the filament guide unit 200 and the filament replacement unit 300 for the filament replacement mechanism, a required filament can be automatically provided for the 3D printer to achieve printing of three-dimensional objects of various colors or various materials, and the unnecessary filament after the return of materials can be automatically wound around the filament spool 400 to keep a clean and tidy environment surrounding the filament spool 400. Meanwhile, the supporting shaft assembly 310 can reduce friction produced during rotation of the filament spool, so as to facilitate loading and unloading. Also, since the supporting shaft assembly 310 is supported on the rim 410 of the filament spool 400, the filament spool 400 can be mounted to the filament replacement mechanism simply by gravity, without other complicated mounting structures. After the filament is consumed, the filament spool 400 can be conveniently taken down from the filament replacement mechanism without disassembling other components, which facilitates replacement.

Although the present disclosure is illustrated and described in detail in the drawings and foregoing description, such illustration and description are to be considered illustrative and schematic, rather than restrictive; the present disclosure is not limited to the disclosed embodiments. Variations to the disclosed embodiments can be understood and implemented by those skilled in the art in practicing the claimed subject matter by studying the accompanying drawings, the disclosures, and the appended claims. In the claims, the term "comprising" does not exclude other elements or steps not listed, the indefinite article "a" or "an" does not exclude a plurality, and the term "a plurality" means two or more. The mere fact that certain measures are recorded in dependent claims that are different from one another does not indicate that these measures cannot be combined to achieve a desirable effect.

| Reference numerals: | |
|---|---|
| 100: support; | 110: arc-shaped groove; |
| 120: separator; | 130: desiccant groove; |
| 140: top cover; | 150: air hole; |
| 200: filament guide unit; | 210: secondary filament guide tube; |
| 220: filament guide opening; | 240: multi-channel member; |
| 300: filament replacement unit; | 310: supporting shaft assembly; |
| 311: first supporting shaft set; | 3111: first supporting shaft; |
| 3112: gear; | 3113: connecting shaft; |
| 312: second supporting shaft set; | 3121: second supporting shaft; |
| 320: loading and unloading mechanism; | 321: channel; |
| 400: filament spool; | 410: rim; |
| 500: humidity sensor; | 600: recognition sensor; |
| 700: bottom case; | 800: cover body. |

The invention claimed is:

1. A 3D printing system, comprising:
a 3D printer;
a multi-channel member, the multi-channel member has an outlet and a plurality of inlets connecting with the outlet, and the outlet is connected to the 3D printer; and
a plurality of filament replacement units, each of the plurality of filament replacement units comprises:
a supporting shaft assembly, which is in contact with a rim of a corresponding filament spool so as to support the corresponding filament spool; and
a loading and unloading mechanism, which is provided with a channel for the filament to penetrate through;
wherein the 3D printing system further comprises a plurality of secondary filament guide tubes, one secondary filament guide tube connects to one inlet of the multi-channel member, and the channel of the loading and unloading mechanism is connected to the inlet of the multi-channel member through a corresponding secondary filament guide tube;
wherein the loading and unloading mechanism is configured to drive a filament wound around the corresponding filament spool to enable the filament to be guided into the multi-channel member via one corresponding secondary filament guide tube of the plurality of secondary filament guide tubes so as to perform a loading operation, and configured to drive the corresponding filament spool to rotate such that the filament withdrawn from the 3D printer is rewound around the corresponding filament spool so as to perform an unloading operation.

2. The 3D printing system according to claim 1, a filament sensor further disposed inside the multi-channel member to detect the position of the filament.

3. The 3D printing system according to claim 1, further comprising a support, wherein the supporting shaft assembly is rotatably connected to the support;
wherein a surface of the support facing a plurality of filament spools is provided with at least one desiccant groove for accommodating a desiccant, and a top cover is mounted at an opening of each of the desiccant grooves, and is provided with a plurality of air holes.

4. The 3D printing system according to claim 1, further comprising a support, wherein the supporting shaft assembly is rotatably connected to the support;
wherein the supporting shaft assembly comprises a first supporting shaft set and a second supporting shaft set rotatably connected to the support separately and spaced apart from each other in a circumferential direction of the corresponding filament spool, and the loading and unloading mechanism is disposed on a side of the first supporting shaft set opposite to the second supporting shaft set;
an end of each secondary filament guide tube, away from the corresponding channel, passes through a central region of the second supporting shaft set and is connected to one inlet of the multi-channel member.

5. The 3D printing system according to claim 4, wherein the first supporting shaft set comprises two first supporting shafts arranged along a first axis of rotation such that circumferential surfaces of the two first supporting shafts are in contact with two rims of the corresponding filament spool, respectively, when the corresponding filament spool is mounted in a filament replacement mechanism.

6. The 3D printing system according to claim 4, wherein at least one first supporting shaft of two first supporting shafts is provided with a gear, wherein the gear is configured to be driven by the loading and unloading mechanism to rotate and drive the at least one first supporting shaft to rotate such that the at least one first supporting shaft drives the corresponding filament spool to rotate when the corresponding filament spool is mounted in a filament replacement mechanism, so as to rewind the filament around the corresponding filament spool to perform an unloading operation.

7. The 3D printing system according to claim 4, wherein one end of the corresponding secondary filament guide that is jointed with the channel is arranged adjacent to a middle portion of the first supporting shaft set along a first axis of rotation.

8. The 3D printing system according to claim 4, wherein the second supporting shaft set comprises two second supporting shafts arranged along a second axis of rotation such that circumferential surfaces of the two second supporting shafts are in contact with two rims of the corresponding filament spool, respectively, when the corresponding filament spool is mounted in a filament replacement mechanism.

9. The 3D printing system according to claim 1, wherein one end of the channel facing away from the corresponding secondary filament guide tube is provided with a trumpet-shaped opening.

10. The 3D printing system according to claim 1, further comprising a support, wherein the supporting shaft assembly is rotatably connected to the support;
wherein the support is provided with an arc-shaped groove extending in a predetermined direction, the predetermined direction is an arrangement direction of a plurality of filament spools, and at least one separator is disposed in the arc-shaped groove and is spaced in the predetermined direction to separate the arc-shaped groove into a plurality of segments, wherein each of the segments is configured to at least partially accommodate the corresponding filament spool.

11. The 3D printing system according to claim 1, further comprising:
a support, wherein the supporting shaft assembly is rotatably connected to the support;
a humidity sensor configured to detect the humidity of a surrounding environment of a plurality of filament spools;
wherein the humidity sensor is disposed at a circuit board located on a back side of the support.

12. The 3D printing system according to claim 1, further comprising:
a circuit board disposed between every two adjacent filament spools of a plurality of filament spools, wherein a recognition sensor is provided on the circuit board and configured to recognize identification information of the filament spools.

13. The 3D printing system according to claim 1, further comprising:
a bottom case; and
a cover body matched with the bottom case, wherein the bottom case and the cover body jointly define an accommodating space, the plurality of filament replacement units are all accommodated in the accommodating space, and the cover body is movable relative to the bottom case to open or close the accommodating space.

14. The 3D printing system according to claim 3, at least one separator is disposed on a surface of the support facing a plurality of filament spools, and the separator and a corresponding desiccant groove are located on opposite sides of the support, respectively, wherein the separator is disposed on a side close to the corresponding loading and unloading mechanism.

15. The 3D printing system according to claim 14, the at least one separator is spaced apart in an arrangement direction of the plurality of filament spools to divide the support into a plurality of segments;
in the arrangement direction of the plurality of filament spools, a length of an opening of the desiccant groove exceeds a length of each of the segments.

16. The 3D printing system according to claim 1, further comprising a support, wherein the supporting shaft assembly is rotatably connected to the support;
a plurality of filament spools are located on an upper side of the support, and the plurality of secondary filament guide tubes are disposed on a lower side of the support.

17. The 3D printing system according to claim 1, an auxiliary extrusion wheel is disposed inside the multi-channel member.

18. The 3D printing system according to claim 1, wherein corresponding material spools being provided with identification information;
the identification information includes the length, color, or material of the filament in the material spool.

19. The 3D printing system according to claim 4, wherein a first axis of rotation of the first supporting shaft set, a second axis of rotation of the second supporting shaft set and an axis of rotation of the corresponding filament spool are parallel to one another.

20. The 3D printing system according to claim 4, wherein the outlet of the multi-channel member is coupled to a main filament guide tube of the 3D printer.

* * * * *